US009250965B2

(12) United States Patent
Alatorre et al.

(10) Patent No.: US 9,250,965 B2
(45) Date of Patent: *Feb. 2, 2016

(54) RESOURCE ALLOCATION FOR MIGRATION WITHIN A MULTI-TIERED SYSTEM

(71) Applicant: International Business Machines Corporation, Armonk, NY (US)

(72) Inventors: Gabriel Alatorre, Long Beach, CA (US); Ann Corrao, Raleigh, NC (US); Nagapramod S. Mandagere, San Jose, CA (US); James E. Olson, Seymour, CT (US); Aameek Singh, University Place, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/818,729

(22) Filed: Aug. 5, 2015

(65) Prior Publication Data

US 2015/0363234 A1    Dec. 17, 2015

Related U.S. Application Data

(63) Continuation of application No. 13/590,292, filed on Aug. 21, 2012, now Pat. No. 9,122,527.

(51) Int. Cl.
*G06F 9/50* (2006.01)
(52) U.S. Cl.
CPC ........................................ *G06F 9/50* (2013.01)
(58) Field of Classification Search
None
See application file for complete search history.

(56) References Cited

U.S. PATENT DOCUMENTS

| 5,436,639 | A | 7/1995 | Arai et al. |
|---|---|---|---|
| 7,007,048 | B1 | 2/2006 | Murray et al. |
| 9,122,527 | B2 | 9/2015 | Alatorre et al. |
| 2005/0240636 | A1 | 10/2005 | Shitomi et al. |
| 2006/0224620 | A1 | 10/2006 | Silverman et al. |
| 2007/0240147 | A1 | 10/2007 | Bernabeu-Auban et al. |
| 2008/0270720 | A1 | 10/2008 | Tanabe et al. |
| 2009/0080398 | A1 | 3/2009 | Mahany et al. |
| 2009/0249005 | A1 | 10/2009 | Bender et al. |
| 2010/0070466 | A1 | 3/2010 | Prahlad et al. |
| 2010/0162257 | A1 | 6/2010 | Hiltunen et al. |
| 2011/0061057 | A1 | 3/2011 | Harris et al. |
| 2011/0153697 | A1 | 6/2011 | Nickolov et al. |
| 2011/0314069 | A1 | 12/2011 | Alatorre et al. |

(Continued)

OTHER PUBLICATIONS

Office Action (Mail Date Jun. 18, 2014) for U.S. Appl. No. 13/590,292, filed Aug. 21, 2012.

(Continued)

*Primary Examiner* — Adam Lee
*Assistant Examiner* — Zhi Chen
(74) *Attorney, Agent, or Firm* — Schmeiser, Olsen & Watts; Matthew Chung

(57) ABSTRACT

A method and system for intelligent tiering is provided. The method includes receiving a request for enabling a tiering process with respect to data. The computer processor retrieves a migration list indicating migration engines associated with the data. Additionally, an entity list of migration entities is retrieved and each migration entity is compared to associated policy conditions. In response, it is determined if matches exist between the migration entities and the associated policy conditions and a consolidated entity list is generated.

9 Claims, 8 Drawing Sheets

(56) References Cited

U.S. PATENT DOCUMENTS

2012/0101973 A1 4/2012 Ito et al.
2014/0059559 A1 2/2014 Alatorre et al.

OTHER PUBLICATIONS

Amendment filed Sep. 11, 2014 in response to Office Action (Mail Date Jun. 18, 2014) for U.S. Appl. No. 13/590,292, filed Aug. 21, 2012.

Final Office Action (Mail Date Dec. 18, 2014) for U.S. Appl. No. 13/590,292, filed Aug. 21, 2012.

Request for Continued Examination and Preliminary Amendment filed Mar. 12, 2015 in response to Final Office Action (Mail Date Dec. 18, 2014) for U.S. Appl. No. 13/590,292, filed Aug. 21, 2012.

Notice of Allowance (Mail Date Apr. 24, 2015) for U.S. Appl. No. 13/590,292, filed Aug. 21, 2012.

Swager et al.; Terremark Cloud Service Agreement; Terremark North American; Mar. 12, 2011; 12 pages.

RESOURCE ALLOCATION FOR MIGRATION WITHIN A MULTI-TIERED SYSTEM

This application is a continuation application claiming priority to Ser. No. 13/590,292 filed Aug. 21, 2012.

FIELD

The present invention relates to a method and associated system for proving intelligent tiering in a multi-tier system.

BACKGROUND

Organizing data comprises an inaccurate process with little flexibility. An organizational method may include a complicated process that may be time consuming and require a large amount of resources. Accordingly, there exists a need in the art to overcome at least some of the deficiencies and limitations described herein.

SUMMARY

The present invention provides a method comprising: receiving, by a computer processor of a computing system from a user, a request for enabling a tiering process with respect to data, wherein the request comprises policies that conditions to be satisfied for matching an entity to a policy of the policies; retrieving, by the computer processor in response to the request, a migration list indicating migration engines associated with the data; retrieving, by the computer processor in response to the migration list, an entity list of migration entities associated with each migration engine of the migration engines; comparing, by the computer processor, each migration entity of the migration entities to associated policy conditions; determining, by the computer processor in response to results of the comparing, if matches exist between the migration entities and the associated policy conditions; and generating, by the computer processor in response to results of the determining, a consolidated entity list associated with the entity list.

The present invention provides a computer program product, comprising a computer readable storage device storing a computer readable program code, the computer readable program code comprising an algorithm that when executed by a computer processor of a computing system implements a method, the method comprising: receiving, by the computer processor from a user, a request for enabling a tiering process with respect to data, wherein the request comprises policies that conditions to be satisfied for matching an entity to a policy of the policies; retrieving, by the computer processor in response to the request, a migration list indicating migration engines associated with the data; retrieving, by the computer processor in response to the migration list, an entity list of migration entities associated with each migration engine of the migration engines; comparing, by the computer processor, each migration entity of the migration entities to associated policy conditions; determining, by the computer processor in response to results of the comparing, if matches exist between the migration entities and the associated policy conditions; and generating, by the computer processor in response to results of the determining, a consolidated entity list associated with the entity list.

The present invention provides a computing system comprising a computer processor coupled to a computer-readable memory unit, the memory unit comprising instructions that when executed by the computer processor implements a method comprising: receiving, by the computer processor from a user, a request for enabling a tiering process with respect to data, wherein the request comprises policies that conditions to be satisfied for matching an entity to a policy of the policies; retrieving, by the computer processor in response to the request, a migration list indicating migration engines associated with the data; retrieving, by the computer processor in response to the migration list, an entity list of migration entities associated with each migration engine of the migration engines; comparing, by the computer processor, each migration entity of the migration entities to associated policy conditions; determining, by the computer processor in response to results of the comparing, if matches exist between the migration entities and the associated policy conditions; and generating, by the computer processor in response to results of the determining, a consolidated entity list associated with the entity list.

The present invention advantageously provides a simple method and associated system capable of organizing data.

DETAILED DESCRIPTION

Figure 1:
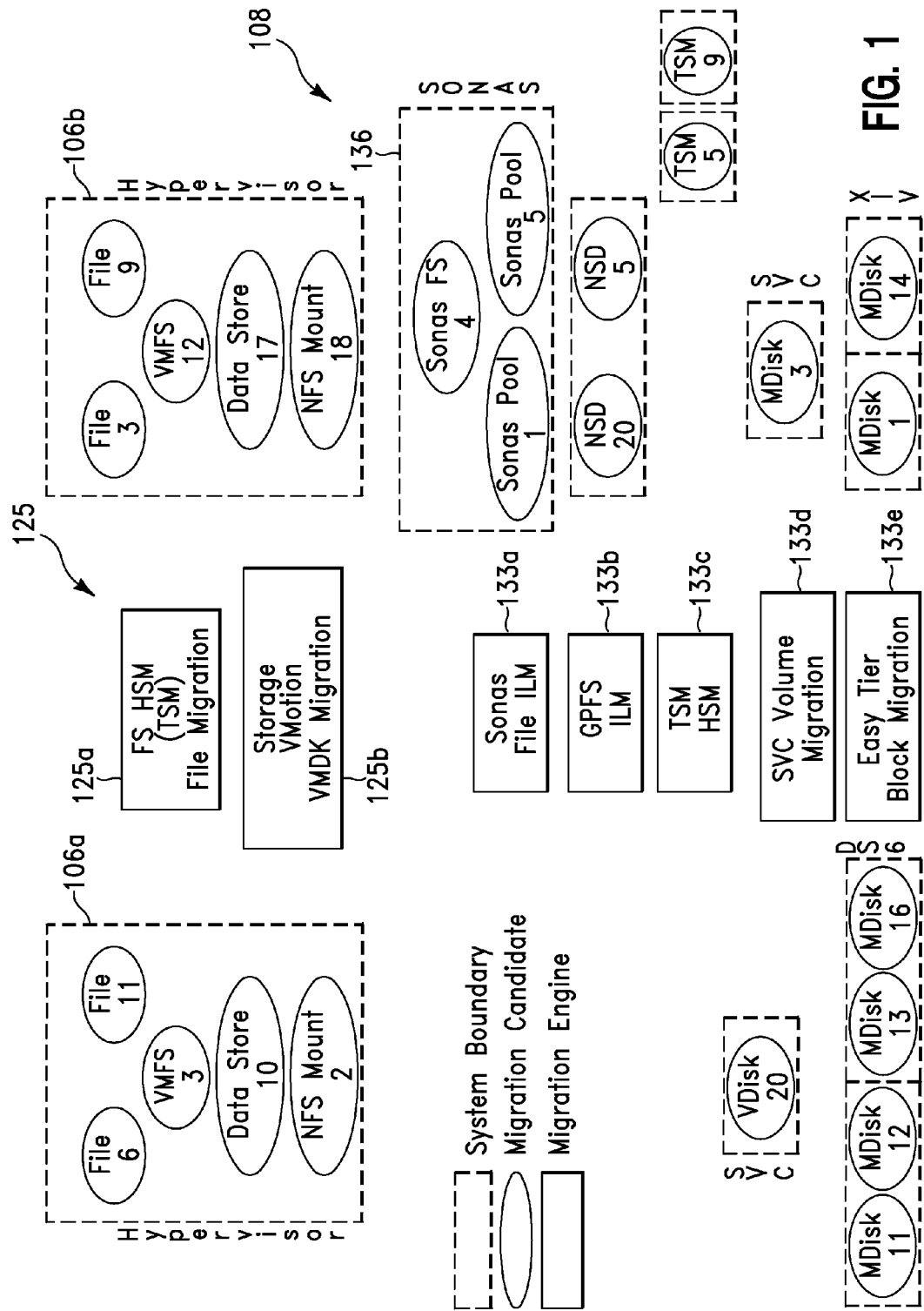
FIG. 1 illustrates a system for providing intelligent tiering for migration services in a heterogeneous multi-tier system, in accordance with embodiments of the present invention.

FIG. 1 illustrates a system 100 for providing intelligent tiering for migration services in a heterogeneous multi-tier system, in accordance with embodiments of the present invention. System 100 enables candidate migration to be modeled and evaluated using a cost/utility model to determine a tradeoff between different migration candidates. A unified cost/utility based evaluation process evaluates tradeoff judgments between migration candidates at different layers/granularities. System 100 enables tiering decisions that evaluate a load balancing process across different migration drivers.

System 100 illustrates an enterprise end-to-end stack system. System 100 comprises a hypervisor 106a, a hypervisor 106b, and a file system 108. Hypervisor 106a comprises a set of files in a VMFS file system 3 residing in a data store 10. Data store 10 is comprised by a logical volume system 2 retrieved from a VC (i.e., external storage such as Vdisk 20). Vdisk 20 is mapped to multiple physical disks (MDisk 11, MDisk 12, MDisk 15, and MDisk 16) associated with different storage controllers. Mdisk 3 is mapped to multiple physical disks (MDisk 1 and MDisk 14) associated with different storage controllers. TSM 5 and TSM 9 comprise a file level migration engine for mapping to name server daemon (NSD) 20 and NSD 5 associated with a domain name system. Hypervisor 106b comprises a set of files 3 and 9 in a VMFS file system 12 residing in a data store 17 (e.g., comprising a NFS mount point 18 residing on NAS solutions (e.g., file system 108). File system 108 maps to NSD 20 and NSD 5. File system 108 comprises a scaled out network attached storage (SONAS) system 136 including SONAS modules 1, 4, and 5. Migration controllers 125a and 125b may act independently of each other. Migration engines 133a . . . 133e comprise engine for providing the intelligent tiering for migration services in a heterogeneous multi-tier system.

Figure 2A:
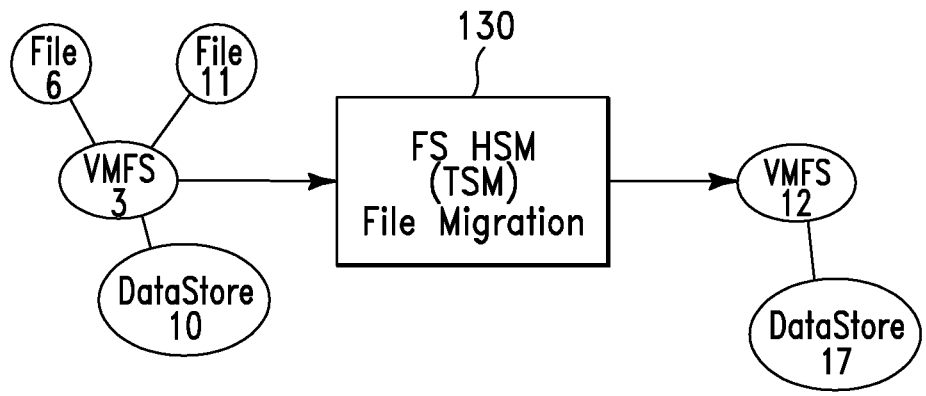
FIG. 2A illustrates a first migration candidate scenario implemented by the system of FIG. 1, in accordance with embodiments of the present invention.

FIG. 2A illustrates a first migration candidate scenario implemented by system 100 of FIG. 1, in accordance with embodiments of the present invention. The first migration candidate scenario of FIG. 2A enables a transfer process for transferring file 6 and file 11 on VMFS 3 to VMFS 12 using a file level tool 130.

Figure 2B:
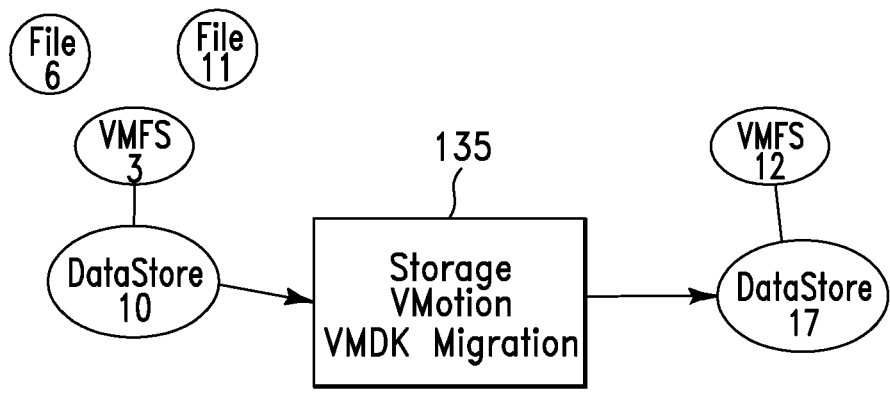
FIG. 2B illustrates a second migration candidate scenario implemented by the system of FIG. 1, in accordance with embodiments of the present invention.

FIG. 2B illustrates a second migration candidate scenario implemented by system 100 of FIG. 1, in accordance with embodiments of the present invention. The second migration candidate scenario of FIG. 2B enables a transfer process for transferring VMFS 3 file system into a different data store 17 using a hypervisor level tool 135.

Figure 2C:
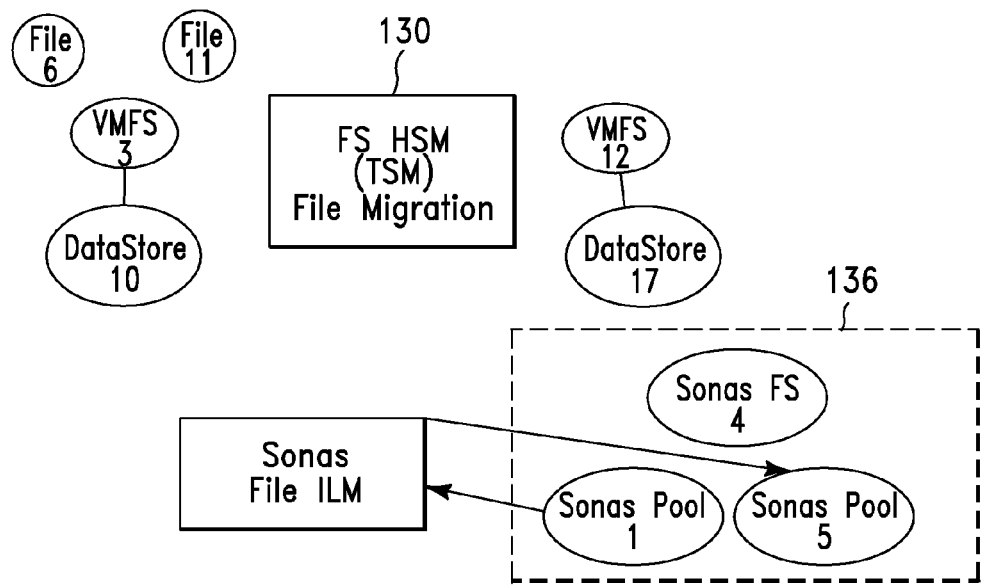
FIG. 2C illustrates a third migration candidate scenario implemented by the system of FIG. 1, in accordance with embodiments of the present invention.

FIG. 2C illustrates a third migration candidate scenario implemented by system 100 of FIG. 1, in accordance with embodiments of the present invention. The third migration candidate scenario of FIG. 2C enables a transfer process for transferring file 6 and file 11 on VMFS 3 within itself by transferring storage at a SONAS layer 136.

Figure 2D:
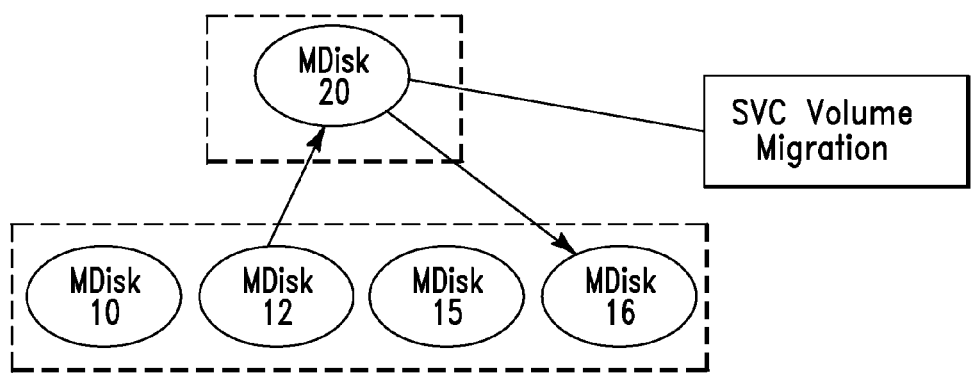
FIG. 2D illustrates a fourth migration candidate scenario implemented by the system of FIG. 1, in accordance with embodiments of the present invention.

FIG. 2D illustrates a fourth migration candidate scenario implemented by system 100 of FIG. 1, in accordance with embodiments of the present invention. The fourth migration candidate scenario of FIG. 2D enables a transfer process for transferring of Data store VDisk 20 using SVC capabilities.

Figure 2E:
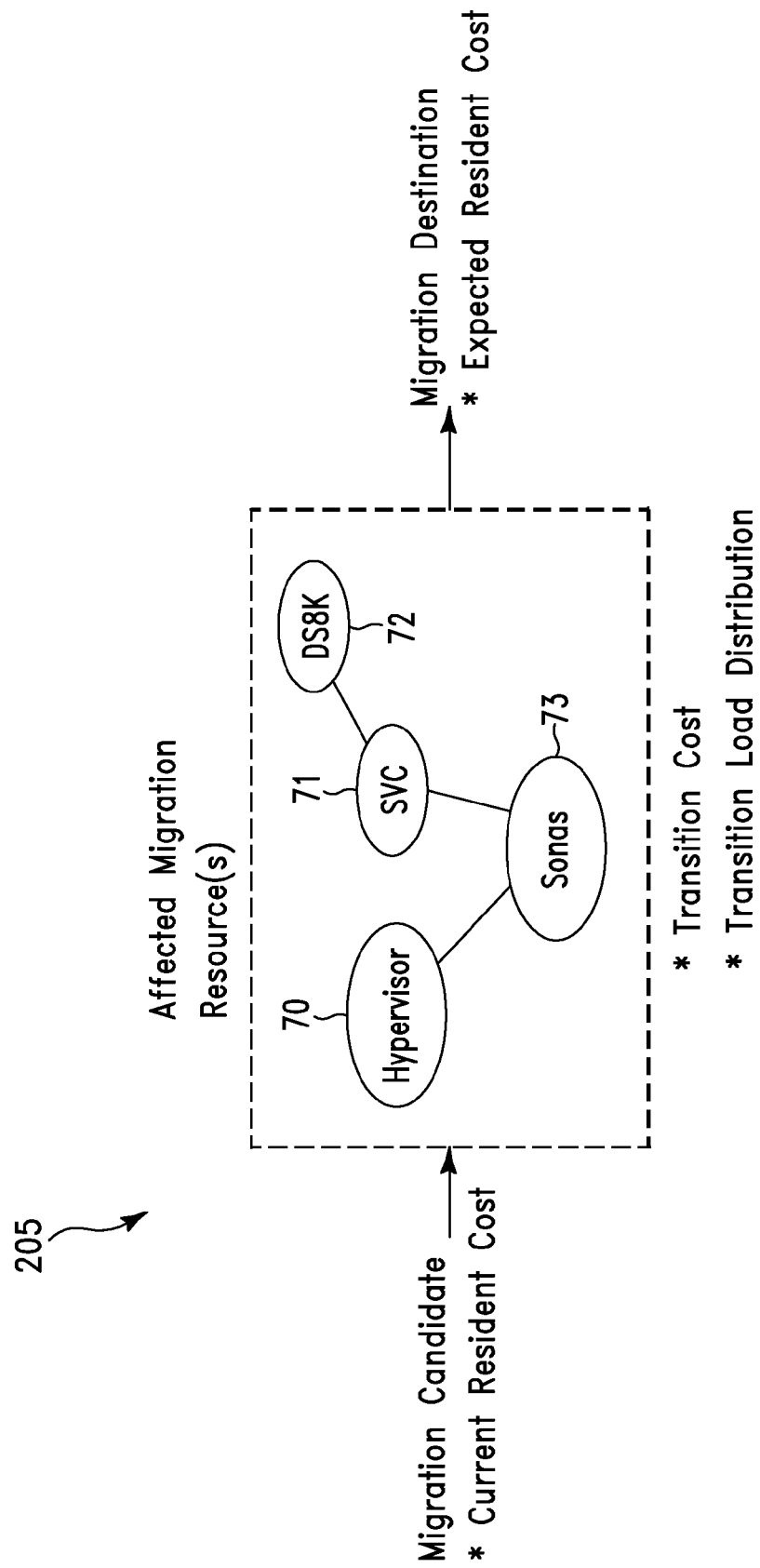
FIG. 2E illustrates a unified migration model generated by the migration candidate scenarios of FIGS. 2A-2D, in accordance with embodiments of the present invention.

FIG. 2E illustrates a unified migration model 205 generated by the migration candidate scenarios of FIGS. 2A-2D, in accordance with embodiments of the present invention. Each migration is identified by a candidate that is a target of an associated migration. Each candidate may comprise any granularity level such as, inter alia, file, file system, data store, volume, block(s), etc. Each migration affects a specified subset of components in an end-to-end stack (e.g., affected resources in a current model). Additionally, each migration comprises a destination that may include a file system, data store, or a volume. The unified migration model 205 captures a utility of a data item as a current resident cost computed as a universal metric such as, inter alia, a cost per GB per day. Additionally, the unified migration model 205 captures an expected resident cost and a transition cost is modeled as a function of components involved in a migration.

Unified migration model 205 formulates a problem as a multi objective optimization problem comprising:
An objective:
  Optimizing storage cost/right tier data.
  Load balance migrations to avoid overloading migration engines constraints.
Constraints:
  Minimize overall incorrectly tiered data inputs.
Inputs:
  Tiering definitions:
  Classification criteria for data.
  Usage/resident cost for tiers.
  Controllers, layers, migration engines.
Outputs:
  Prioritized list of migrations.
  Expected tier utilizations.

Unified migration model 205 represents all migration candidates as an interconnected graph. Each migration represents a path from a source to a destination. A cost of edges represents the transitional costs from node to node (i.e., nodes 70, 71, 72, 73, etc.). A path cost represents an overall transitional cost of migration. Identifying paths that intersect generates an estimation of potentially conflicting migrations.

Figure 3:
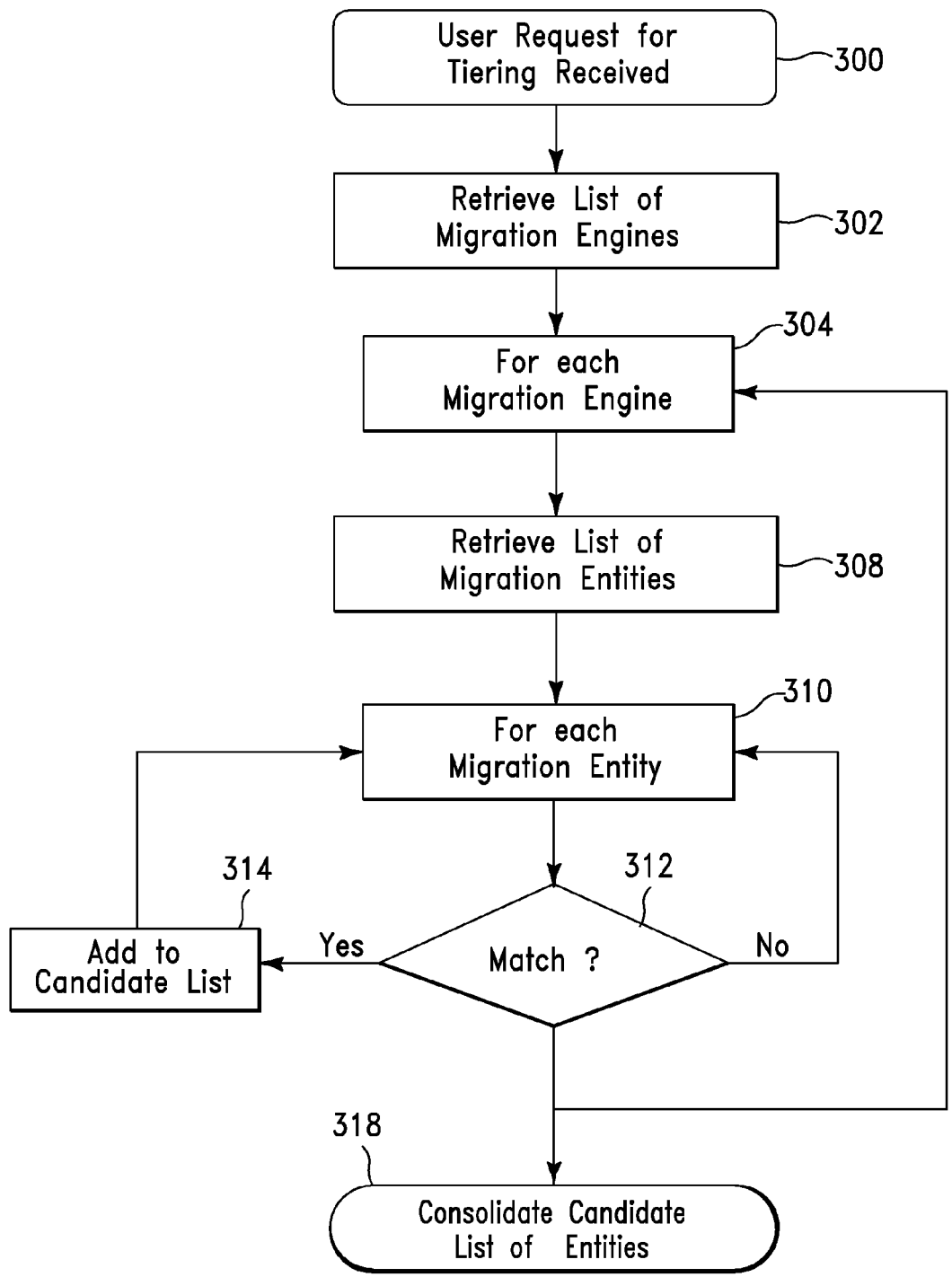
FIG. 3 illustrates an algorithm detailing a process flow enabled by the system of FIG. 1 for performing an independent candidate selection process, in accordance with embodiments of the present invention.

FIG. 3 illustrates an algorithm detailing a process flow enabled by system 100 of FIG. 1 for performing an independent candidate selection process, in accordance with embodiments of the present invention. In step 300, a computer processor (e.g., of system 100 of FIG. 1) receives a user specified request for tiering. The user specified request may be expressed in a form of policies. Each policy may include an associated set of conditions to be satisfied if an entity may match a policy. An entity includes, inter alia, files, a virtual machine, a file system, a virtualized/physical storage volume, a set of blocks, etc. In step 302, a list of migration engines (within an end-to-end stack) is retrieved. For example, an end-to-end stack may include, inter alia, a file level migration engine (e.g., TSM/HSM, etc), a file system level migration engine (VMWare Storage, VMotion, etc), an NAS file set/file level migration engine, a volume level migration engine (SVC or subsystems), etc. In step 304, a loop thru each available migration engine is initiated. In step 308, (for each migration engine) a list comprising all managed entities is retrieved. For example, if a migration engine comprises a TSM, the list of managed entities may include files currently being managed by a TSM. In step 310, a loop thru each of the entities in the retrieved list (from step 308) is initiated. In step 312, it is determined if an entity matches policy conditions. For example, an entity file foo.txt (a migration engine TSM) is compared to a policy stating that data that has not been accessed in 60 days should be transferred from higher classes of storage to tier 3 lower cost storage. In this example, step 312 will determine if foo.txt has been accessed in the last 60 days. If in step 312, it is determined that an entity matches policy conditions then the entity is added to a candidate list and step 310 is repeated for each migration entity. If in step 312, it is determined that an entity does not match policy conditions then step 304 is repeated. In step 318, (i.e., when all entities have been tested) a consolidated list of candidate entities is generated and an optional cleanup step is applied to remove duplicate entities.

Figure 4:
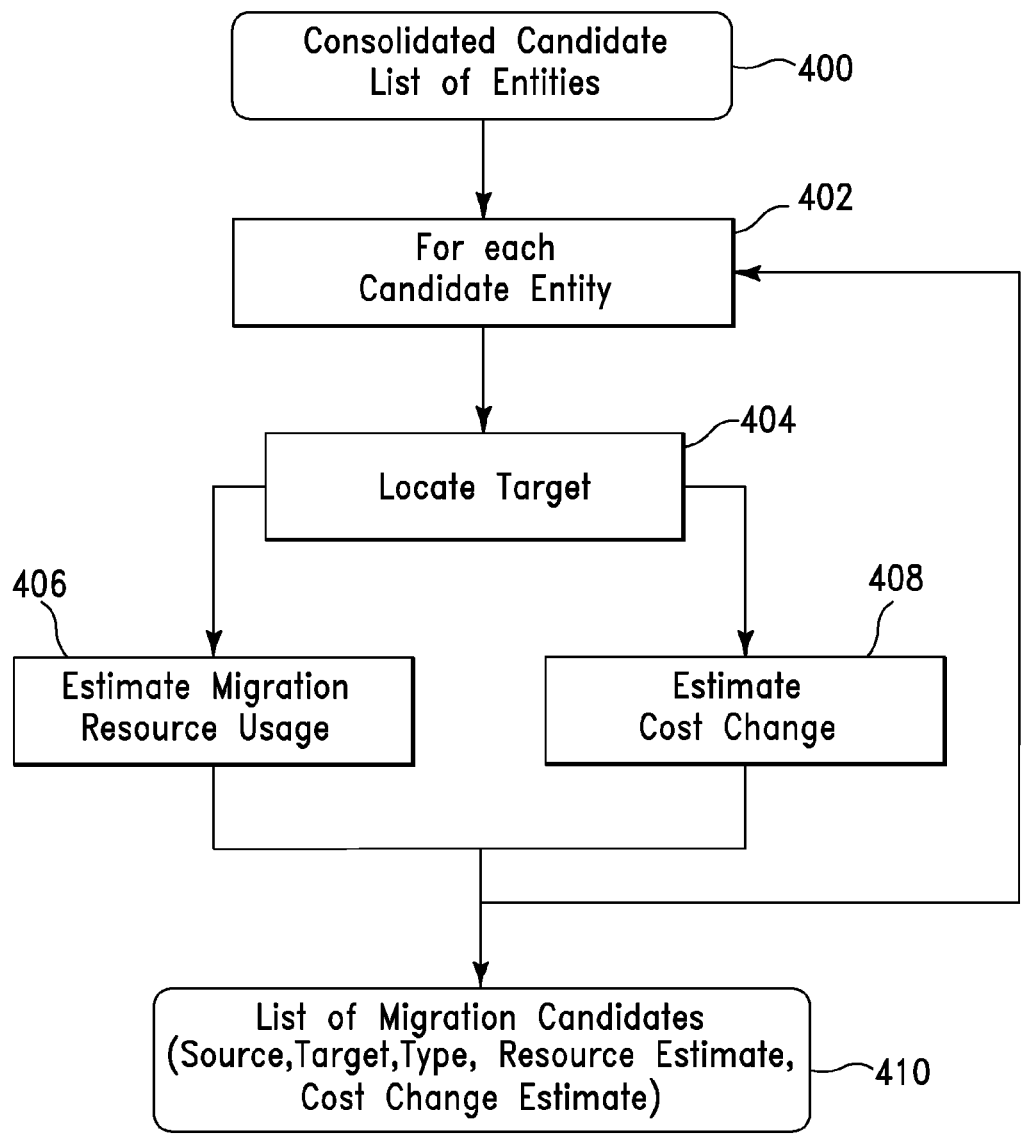
FIG. 4 illustrates an algorithm detailing a process flow enabled by the system of FIG. 1 for modeling migrations, in accordance with embodiments of the present invention.

FIG. 4 illustrates an algorithm detailing a process flow enabled by system 100 of FIG. 1 for modeling migrations, in accordance with embodiments of the present invention. In step 400, the consolidated list of candidate entities (generated in step 318 of the algorithm of FIG. 3) is inputted. The consolidated list may include files, virtual machines, file systems, file sets, volumes, block sets, etc. In step 402, a loop thru each of the candidates is initiated. In step 404, (for each candidate entity) a possible target location is determined. For example, if an entity comprises a file, then an appropriate path to relocate file may be located. For example, a file (Foo.txt) may need to be moved to a Tier 3 memory device and therefore Foo.txt may be moved from drive C:\ to drive E:\ (i.e., assuming drive E:\ is Tier 3 memory device). In step 406, (for a source-target pair migration candidate) migration resource usage is estimated. For example, migrations require CPU, network, and disk resources. In step 408, a cost change for a migration candidate is estimated. For example, moving a file (Foo.txt) from a Tier 1 memory device to a Tier 3 memory device may move X GBs of data. A Tier memory device may include a cost of X/GB and a Tier 3 memory device may include a cost of Y/GB. Therefore, a cost change comprises a file size of (Foo.txt)*X−a file size of (Foo.txt)*Y. In step 410 a list of migration candidates is generated. Each candidate may comprise a source, target, type, resource estimate, and cost change estimate.

Figure 5:
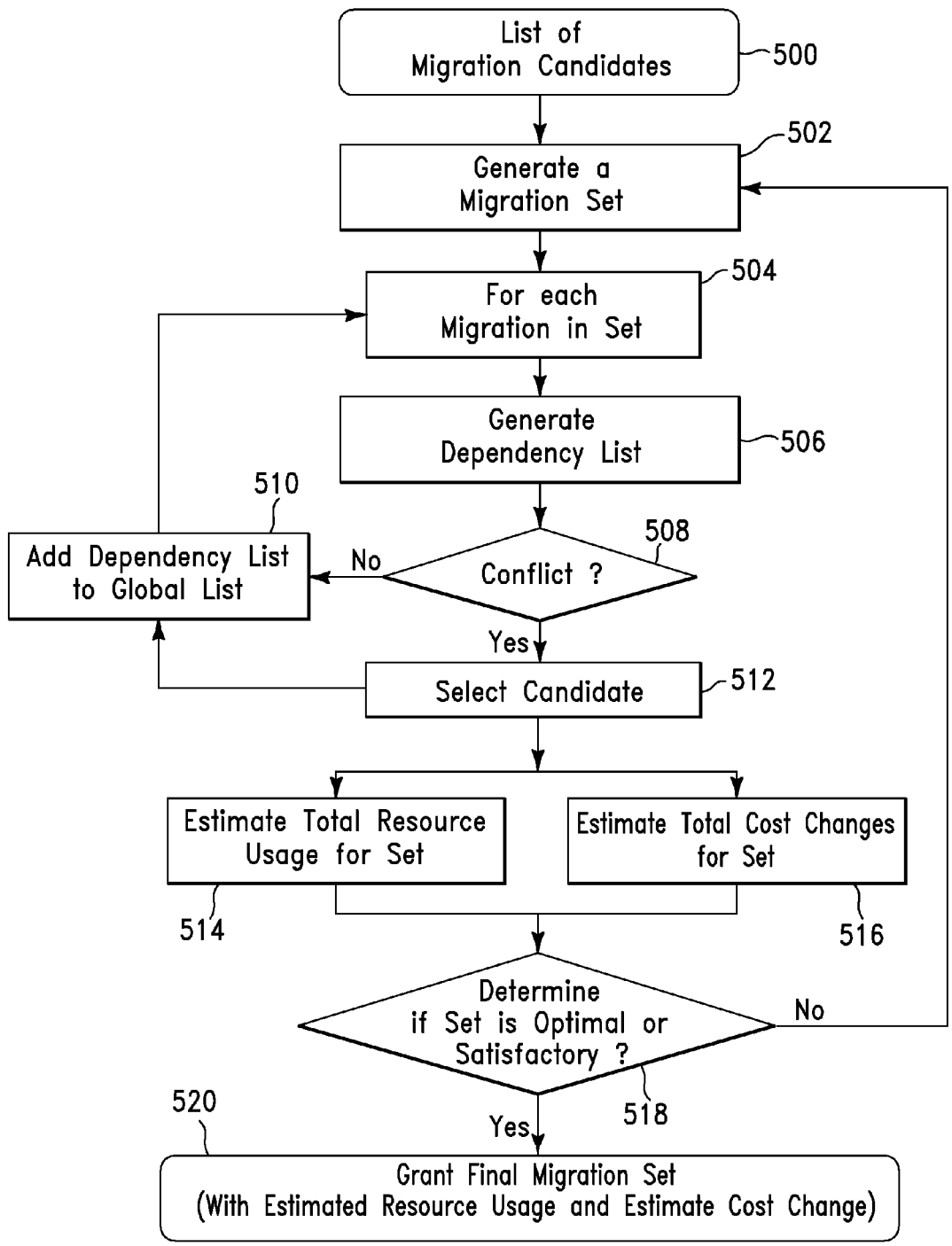
FIG. 5 illustrates an algorithm detailing a process flow enabled by the system of FIG. 1 for performing a global optimization, in accordance with embodiments of the present invention.

FIG. 5 illustrates an algorithm detailing a process flow enabled by system 100 of FIG. 1 for performing a global optimization, in accordance with embodiments of the present invention. In step 500, the list of migration candidates (generated in step 410 of the algorithm of FIG. 4) is inputted. In step 502, a migration set is generated from the list of migration candidates. The migration set comprises a collection of migration candidates. The migration set may be generated as a random selection. For example, 90% of the candidates may be selected randomly from the list of migration candidates. In step 504, a loop thru a selected migration set is initiated. In 506, (for each migration candidate) a dependency list is generated. A dependency list comprises a list of all nodes connected/related to a source migration entity in and end-to-end system graph. For example, if a source migration entity comprises foo.txt, then all entities below foo.txt in the hierarchy (until a storage/disk layer) may be comprised by the dependency list: foo.txt→c:\\→vdisk10→storage volumeZ→disk 1. Therefore, a dependency list may include a collection of nodes within an upstream and downstream path of a source migration entity within an end-to-end system graph. In step 508, it is determined if any nodes within the dependency list already exist within a global dependency list. If intersections/overlaps (of the nodes) exist, then a potential conflict is indicated. If in step 508, it is determined that nodes within the dependency list do not already exist within a global dependency list, then in step 510 the dependency list is added to the global list and step 504 is repeated. If in step 508, it is determined that nodes within the dependency list do already exist within the global dependency list, then in step 512 the migration candidate is selected and a tradeoff between a new candidate and conflicting candidates is examined. For example, an estimate of cost change metric may be used. In step 514 an estimate of total resource usage for the migration set is calculated. In step 516 an estimate of total cost changes for the migration set is calculated. In step 518, it is determined if the migration set is optimal. If in step 518, it is determined that the migration set is not optimal then step 502 is repeated. If in step 518, it is determined that the migration set is optimal then in step 520, a final migration set is generated. The final migration set may include a list of migration candidates and associated total estimated resource usage and total estimated cost changes.

Figure 6:
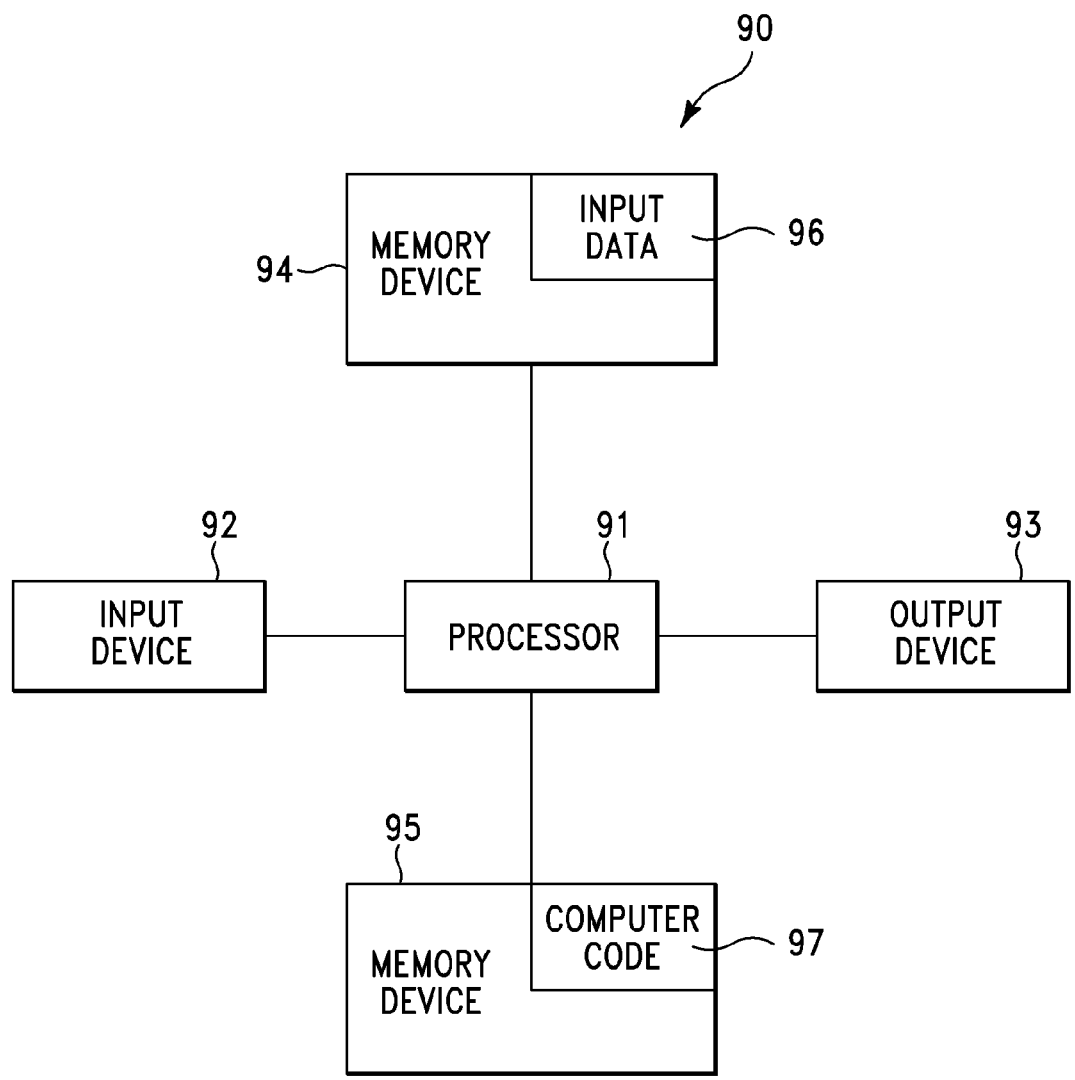
FIG. 6 illustrates a computer apparatus used by the system of FIG. 1 for providing intelligent tiering for migration services in a heterogeneous multi-tier system, in accordance with embodiments of the present invention.

FIG. 6 illustrates a computer apparatus 90 used by system 100 of FIG. 1 for providing intelligent tiering for migration services in a heterogeneous multi-tier system, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3-5) for providing intelligent tiering for migration services in a heterogeneous multi-tier system. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 3-5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to provide intelligent tiering for migration services in a heterogeneous multi-tier system. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for providing intelligent tiering for migration services in a heterogeneous multi-tier system. In another embodiment, the invention provides a business method that performs the process steps of the invention on a subscription, advertising, and/or fee basis. That is, a service supplier, such as a Solution Integrator, could offer to provide intelligent tiering for migration services in a heterogeneous multi-tier system. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:

receiving, by a computer processor of a computing system from a user, a request for enabling a tiering process with respect to data, wherein said request comprises policies including conditions to be satisfied for matching an entity to a policy of said policies, and wherein said tiering process is associated with a classification of criteria for said data and a usage and resident cost for associated tiers;

retrieving, by said computer processor in response to said request, a migration list indicating migration engines associated with said data, wherein said migration engines comprise logical volume level migration engines, and wherein each of said migration engines is responsible for one level of said data;

comparing, by said computer processor, each migration entity of migration entities to associated policy conditions;

determining, by said computer processor in response to results of said comparing, if cost and utility based matches exist between said migration entities and said associated policy conditions, wherein said match is defined by said data and has not been accessed during a specified time period;

determining, by said computer processor is response to analyzing a consolidated entity list associated with said entity list, a target location associated with migration of entities of said consolidated entity list, said target location comprising a destination including a logical volume mapped to physical disks;

first estimating, by said computer processor, resource usage associated with said migration of said entities of said consolidated entity list, wherein said resource usage is associated with CPU resources, network resources, and disk resources;

second estimating, by said computer processor in response to results of said entity data that has not been accessed during a specified time period, a cost change associated with said migration of said entities of said consolidated entity list, wherein said migration comprises moving said first file from a Tier 1 memory device to a Tier 3 memory device, wherein said first file comprises X GBs of data, wherein said Tier 1 memory device is associated with a cost of X/gigabyte (GB) and said Tier 3 memory device is associated with a cost of Y/GB, wherein said cost change equals a file size of (the first file)*X−a file size of (the first file)*Y;

generating, by said computer processor in response to results of: said analyzing; said determining said target location; said first estimating; and said second estimating, a candidate migration list comprising migration candidates from said consolidated entity list, wherein each candidate of said migration candidates is associated with a specified granularity level comprising a file system, a logical volume, and a block;

randomly selecting, by said computer processor from said candidate migration list, a migration set comprising a subset of migration candidates of said candidate migration list;

generating, by said computer processor, a dependency list for each migration candidate of said subset of migration candidates, wherein each said dependency list comprises a list of nodes connected to each migration candidate of said subset of migration candidates in an end-to-end system graph, and wherein said nodes include a collection of nodes within an upstream and downstream path of a source migration entity of said consolidated entity list within said end-to-end system graph; and determining, by said computer processor, that a group of nodes of said nodes exist within a global dependency list.

2. The method of claim 1, further comprising:

removing, by said computer processor, duplicate entities of said migration entities, wherein said consolidated entity list does not comprise said duplicate entities.

3. The method of claim 1, wherein entities of said consolidated entity list comprises files, virtual machines, file systems, file sets, volumes, and block sets.

4. A computer program product, comprising a computer readable hardware storage device storing a computer readable program code, said computer readable program code comprising an algorithm that when executed by a computer processor of a computing system implements a method, said method comprising:

receiving, by said computer processor from a user, a request for enabling a tiering process with respect to data, wherein said request comprises policies including conditions to be satisfied for matching an entity to a policy of said policies, and wherein said tiering process is associated with a classification of criteria for said data and a usage and resident cost for associated tiers;

retrieving, by said computer processor in response to said request, a migration list indicating migration engines associated with said data, wherein said migration engines comprise logical volume level migration engines, and wherein each of said migration engines is responsible for one level of said data;

comparing, by said computer processor, each migration entity of migration entities to associated policy conditions;

determining, by said computer processor in response to results of said comparing, if cost and utility based matches exist between said migration entities and said associated policy conditions, wherein said match is defined by said data and has not been accessed during a specified time period;

determining, by said computer processor is response to analyzing a consolidated entity list associated with said entity list, a target location associated with migration of entities of said consolidated entity list, said target location comprising a destination including a logical volume mapped to physical disks;

first estimating, by said computer processor, resource usage associated with said migration of said entities of said consolidated entity list, wherein said resource usage is associated with CPU resources, network resources, and disk resources;

second estimating, by said computer processor in response to results of said entity data that has not been accessed during a specified time period, a cost change associated with said migration of said entities of said consolidated entity list, wherein said migration comprises moving said first file from a Tier 1 memory device to a Tier 3 memory device, wherein said first file comprises X GBs of data, wherein said Tier 1 memory device is associated with a cost of X/gigabyte (GB) and said Tier 3 memory device is associated with a cost of Y/GB, wherein said cost change equals a file size of (the first file)*X−a file size of (the first file)*Y;

generating, by said computer processor in response to results of: said analyzing; said determining said target location; said first estimating; and said second estimating, a candidate migration list comprising migration candidates from said consolidated entity list, wherein each candidate of said migration candidates is associated with a specified granularity level comprising a file system, a logical volume, and a block;

randomly selecting, by said computer processor from said candidate migration list, a migration set comprising a subset of migration candidates of said candidate migration list;

generating, by said computer processor, a dependency list for each migration candidate of said subset of migration candidates, wherein each said dependency list comprises a list of nodes connected to each migration candidate of said subset of migration candidates in an end-to-end system graph, and wherein said nodes include a collection of nodes within an upstream and downstream path of a source migration entity of said consolidated entity list within said end-to-end system graph; and determining, by said computer processor, that a group of nodes of said nodes exist within a global dependency list.

5. The computer program product of claim 4, wherein said method further comprises:

removing, by said computer processor, duplicate entities of said migration entities, wherein said consolidated entity list does not comprise said duplicate entities.

6. The computer program product of claim 4, wherein entities of said consolidated entity list comprises files, virtual machines, file systems, file sets, volumes, and block sets.

7. A computing system comprising a computer processor coupled to a computer-readable memory unit, said memory unit comprising instructions that when executed by the computer processor implements a method comprising:

receiving, by said computer processor from a user, a request for enabling a tiering process with respect to data, wherein said request comprises policies including conditions to be satisfied for matching an entity to a policy of said policies, and wherein said tiering process is associated with a classification of criteria for said data and a usage and resident cost for associated tiers;

retrieving, by said computer processor in response to said request, a migration list indicating migration engines associated with said data, wherein said migration engines comprise logical volume level migration engines, and wherein each of said migration engines is responsible for one level of said data;

comparing, by said computer processor, each migration entity of migration entities to associated policy conditions;

determining, by said computer processor in response to results of said comparing, if cost and utility based matches exist between said migration entities and said associated policy conditions, wherein said match is defined by said data and has not been accessed during a specified time period;

determining, by said computer processor is response to analyzing a consolidated entity list associated with said entity list, a target location associated with migration of entities of said consolidated entity list, said target location comprising a destination including a logical volume mapped to physical disks;

first estimating, by said computer processor, resource usage associated with said migration of said entities of said consolidated entity list, wherein said resource usage is associated with CPU resources, network resources, and disk resources;

second estimating, by said computer processor in response to results of said entity data that has not been accessed during a specified time period, a cost change associated with said migration of said entities of said consolidated entity list, wherein said migration comprises moving said first file from a Tier 1 memory device to a Tier 3 memory device, wherein said first file comprises X GBs of data, wherein said Tier 1 memory device is associated with a cost of X/gigabyte (GB) and said Tier 3 memory device is associated with a cost of Y/GB, wherein said cost change equals a file size of (the first file)*X−a file size of (the first file)*Y;

generating, by said computer processor in response to results of: said analyzing; said determining said target location; said first estimating; and said second estimating, a candidate migration list comprising migration candidates from said consolidated entity list, wherein each candidate of said migration candidates is associated with a specified granularity level comprising a file system, a logical volume, and a block;

randomly selecting, by said computer processor from said candidate migration list, a migration set comprising a subset of migration candidates of said candidate migration list;

generating, by said computer processor, a dependency list for each migration candidate of said subset of migration candidates, wherein each said dependency list comprises a list of nodes connected to each migration candidate of said subset of migration candidates in an end-to-end system graph, and wherein said nodes include a collection of nodes within an upstream and downstream path of a source migration entity of said consolidated entity list within said end-to-end system graph; and determining, by said computer processor, that a group of nodes of said nodes exist within a global dependency list.

8. The computing system of claim 7, wherein said method further comprises:

removing, by said computer processor, duplicate entities of said migration entities, wherein said consolidated entity list does not comprise said duplicate entities.

9. The computing system of claim 7, wherein entities of said consolidated entity list comprises files, virtual machines, file systems, file sets, volumes, and block sets.

* * * * *